US006025005A

United States Patent [19]

Pickenhagen et al.

[11] Patent Number: 6,025,005

[45] Date of Patent: Feb. 15, 2000

[54] AROMATIC AND/OR FLAVOR SUBSTANCES

[75] Inventors: Wilhelm Pickenhagen, Höxter; Axel Schöning, Holzminden; Sabine Widder, Holzminden; Dirk Lauven, Holzminden, all of Germany

[73] Assignee: Dragoco Gerberding & Co. AG, Germany

[21] Appl. No.: 08/932,742

[22] Filed: Sep. 17, 1997

[30] Foreign Application Priority Data

Sep. 17, 1996 [DE] Germany .......................... 196 37 781

[51] Int. Cl.[7] ....................................................... A23L 1/22

[52] U.S. Cl. .......................... 426/535; 426/534; 426/536; 426/538; 510/108

[58] Field of Search .................................... 426/534, 535, 426/536, 538; 510/108

[56] References Cited

U.S. PATENT DOCUMENTS

| | | | |
|---|---|---|---|
| 4,883,884 | 11/1989 | Boden et al. | 549/74 |
| 4,886,897 | 12/1989 | Boden et al. | 558/252 |
| 4,983,579 | 1/1991 | Boden et al. | 512/6 |

FOREIGN PATENT DOCUMENTS

| | | |
|---|---|---|
| 0369668 | 5/1990 | European Pat. Off. . |

OTHER PUBLICATIONS

Boden et al., 1990:572378, Document No. 113:172378.

*Primary Examiner*—Leslie Wong
*Attorney, Agent, or Firm*—Pendorf & Cutliff

[57] ABSTRACT

There is described the utilization of thiocarbonic acid or carbothioic acid of the general formula

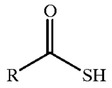

R=Methyl, Ethyl, Propyl, Phenyl as an aroma and/or flavor substance. Further, aroma and/or flavor substance compositions are described, which have a content of thiocarbonic acid or carbothioic acids of the general formula I. It is preferred that the content of the thiocarbonic acid or carbothioic acids are between $10^{-6}$ and $5\times10^{-4}$. Tropical aromas and scent substances in particular can be positively influenced olfactorily and sensorily.

16 Claims, No Drawings

AROMATIC AND/OR FLAVOR SUBSTANCES

BACKGROUND OF THE INVENTION

1. Field of the Invention

The invention concerns the use of known thiocarbonic acid or carbothioic acids of the general formula I as aromatic and/or flavor compounds (flavoring substances).

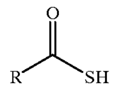

R=Methyl, Ethyl, Propyl, Phenyl

The invention further concerns aromatic and/or flavoring substance compositions, which are characterized by a content of thiocarbonic acid or carbothioic acids of general formula I. The inventive thiocarbonic acid or carbothioic acids can be employed individually as well as in combinations thereof.

2. Description of the Related Art

The compound of general formula I can be produced by those of ordinary skill in the art in a conventional manner; the processes for production are set forth in publicly available technical literature.

There is generally a constant need for synthetic aromatic and flavor substances, which can be produced economically and with uniform quality, which remain stable over long periods of time when stored even in contact with other compounds and which have desirable olfactory or, as the case may be, flavor characteristics. Aromatic substances should have pleasant, preferably natural notes of sufficient intensity and should be capable of beneficially influencing the aroma of cosmetics or technical consumer goods (goods such as soaps or detergents which are not perfumes but are perfumed for better consumer acceptance). Flavoring substances should be well tolerated, should remind one of typical flavor components of favorite foods or should be identical thereto and should thus be capable of positively influencing the taste of consumables, orally administered medications and the like. The discovery or development of aromatic and flavor substances, which satisfy these requirements, has been found to be relatively expensive and requires as a rule substantial research, in particular, when it is desired to produce new and interesting scent notes or to go in new flavor directions.

The search for suitable aromatic or flavor substances has been complicated for the technician in the art by the following:

- The mechanisms of flavor or aroma development are not known.
- The quantitative characterizing of a scent or aroma is not possible.
- The correlation between smell and/or flavor development on the one hand and the chemical structure of the aromatic and/or flavor substances on the other hand have not been sufficiently researched.
- Frequently, small changes in the structural composition between known aromatic or flavor substances result in drastic changes of the olfactory or taste characteristics and impact the ability of the human organism to tolerate it.

The success of the search for suitable aromatic or flavor substances thus frequently depends on the intuition of the searcher.

Thioacetates are described in the literature (ROMPP Chemical Lexicon, Thieme Publishing House, Stuttgart, 9$^{th}$ Edition, Volume 6, page 4585) is smoking when in contact with air, with a stinking, unpleasant odor, of which the vapors irritate and injure the eyes, the respiratory pathway and the lungs as well as the heart. The remaining thiocarbonic acid or carbothioic acids according to the invention have similar characteristics.

SUMMARY OF THE INVENTION

Despite these characteristics well known to those working in the art, it is a surprise, that the inventive thiocarbonic acid or carbothioic acids can now, when diluted to a human organism non-injurious amount, be employed as excellent aromatic and flavor substances.

Thiocarbonic acid or carbothioic acids have until now been frequently employed as reagents in the synthesis of sulfurous inorganic substances and thus have been known in the synthesis of aroma and flavor substances; in EP 369 668, U.S. Pat. No. 4,886,897 and U.S. Pat. No. 4,285,984 there is described, for example, the synthesis of such aroma or flavor substances with the help of thiocarbonic acid or carbothioic acids. In view of the distinctive unpleasant characteristics of the thiocarbonic acid or carbothioic acids (see above) and in view of their substantial reactivity with respect to organic compounds, it has been considered inconceivable to employ these substances themselves as aromatic or flavor substances.

The thiocarbonic acid or carbothioic acids according to the invention are—in the respective specified small concentrations exceptionally suitable for employment in flavorings of the most varying type. They exhibit a sulfurous, herb-fruity, or fresh-fruity flavor and are thus particularly suitable for employment in fruit flavors, in particular tropical fruit flavors, such as grapefruit, guava, mango, pineapple, passion fruit, and the like. Thiocarbonic acid or carbothioic acids are particularly suitable for use in grapefruit oil; here a definite standardization in the direction of herb-fruit skin/rind/peel-fruity can be achieved (see Example 1 below).

Aromatically the sufficiently diluted thiocarbonic acid or carbothioic acids and thioproprionic acids can be characterized as having naturally-fruity or sulfurously fruity notes, as is desired in many fragrance compositions (=aroma compositions). Thiobutyric acid contributes to certain aromatic compositions a strawberry like note, thiobenzoic acids communicate a fresh-fruity note with grapefruit accent to certain aromatic compositions.

The inventive thiocarbonic acid or carbothioic acids can be mixed in or added to the conventional components which are conventionally used in aromatic and flavor compositions. The goal herein is always the adjustment of the weight of a desired olfactory or sensory effect (corresponding to a specific concentration) of the thiocarbonic acid or carbothioic acid within the total or overall composition or bouquet. Favorable parts by weight (=based on total weight) normally lie below $10^{-4}$, usually in the range between $10^{-6}$ and $5\times10^{-4}$, however in certain cases they may also exceed $10^{-4}$.

In the following, the invention will be described in greater detail with reference to select examples. Respectively beginning with typical basic compositions, the effect will be described which is imparted by the addition of, or as the case may be, the co-mixing of the thiocarbonic acid or carbothioic acids in the inventive amounts. The described olfactory and sensory effects are exhibited in the same manner also with different typical basic formulations, in particular in other tropical aromas and fragrance compositions.

The amounts described in the examples are respectively "parts by weight".

| Example 1 DETAILED DESCRIPTION OF THE INVENTION | | |
|---|---|---|
| Flavor Composition Grapefruit: | A | B |
| Paracymol (methyl -1- propobenzol) | 0.30 | 0.30 |
| Beta-pinen | 0.40 | 0.40 |
| Octanal | 0.50 | 0.50 |
| Decanal | 0.70 | 0.70 |
| Carveol | 0.90 | 0.90 |
| Grapefruit juice aroma oil 3-fold | 100.00 | 100.00 |
| Orange oil terpene | 120.00 | 120.00 |
| Ethanol | 777.20 | 777.20 |
| Thioacetic acid 1% in ethanol | | 9.00 |
| | 997.00 | 1000.00 |

The aroma of the flavor substance-basic composition (Column A) is made significantly herbal-fruitier by the addition of thioacetic acid (Column B; 8 parts per 1% of the solution in ethanol) and corresponds thereby to the typical natural aroma of a grapefruit.

| Example 2 | | |
|---|---|---|
| Aroma Composition Guava: | A | B C D |
| Aldehyde C14 | 70.00 | 70.00 |
| Allylcapronate | 8.00 | 8.00 |
| Cassis bourgeons Abs. 30% Migliol | 5.00 | 5.00 |
| Cumarin | 20.00 | 20.00 |
| Dihydromyrcene Oil | 30.00 | 30.00 |
| Dimethylbenzylcarbonylbutyrate | 65.00 | 65.00 |
| Ethyl Maltol | 5.00 | 5.00 |
| Frambinon crist. | 10.00 | 10.00 |
| Guava 10875 N | 20.00 | 20.00 |
| Heliotropine | 30.00 | 30.00 |
| Hexenylacetate cis-3 | 10.00 | 10.00 |
| Hexylbutyrate | 8.00 | 8.00 |
| Hexylcinnamonaldehyde | 160.00 | 160.00 |
| Hivertal | 10.00 | 10.00 |
| Indol | 3.00 | 3.00 |
| Iridane-beta | 65.00 | 65.00 |
| Linalol | 130.00 | 130.00 |
| Methyloctancarbonate | 1.00 | 1.00 |
| Orange Oil Guinea | 150.00 | 150.00 |
| Phenylacetaldehyde 50% in Dipropyleneglycol | 10.00 | 10.00 |
| Phenylethylalcohol | 100.00 | 100.00 |
| Phenylethylisobutyrate | 40.00 | 40.00 |
| Rosen Oxide-L | 5.00 | 5.00 |
| Styrylacetate | 12.00 | 12.00 |
| Cinnamon Alcohol | 30.00 | 30.00 |
| Thiocarbonic Acid according to Formula I 1% in DEP | | 3.00 |
| | 997.00 | 1,000.00 |

EXAMPLE 2B

The fragrance of the aroma substance-basic composition A is made noticeably sulfurous-fruitier by the addition of thioacidic acid (Column B; R=methyl; 3 parts by weight of a 1% solution of diethyl phthalate), wherein the natural aroma of a guava is elicited.

EXAMPLE 2C

The fragrance of aroma substance-basic composition A, gains an increase in intensity of strawberry-like notes by addition of thiobutyric acid (Column C; R=propyl; 3 parts by weight of a 1% solution in dyethyl phthalate). The total impression of the composition is more complex and can be described as softer/more voluminous.

EXAMPLE 2D

The fragrance of aroma substance-basic composition A is made noticeably fresh-fruitier by the addition of thiobenzoic acid (Column D; R=phenyl; 3 parts by weight of a 1% solution of diethyl phthalate) and receives stronger headnotes, which elicit grapefruit aspects.

EXAMPLE 3

| Flavor Composition Mango: | A | B |
|---|---|---|
| Sulphurole | 0.05 | 0.05 |
| Phenylethylalcohol | 2.00 | 2.00 |
| cis-3-Hexenol | 3.00 | 3.00 |
| Gamma-Decalactone | 10.00 | 10.00 |
| Ethylbutyrate | 10.00 | 10.00 |
| Myrcene | 15.00 | 15.00 |
| 2,5-Dimethyl-4-hydroxy-3-(2H)furanon 15% in Propyleneglycol | 20.00 | 20.00 |
| Triacetane | 936.95 | 926.95 |
| Thioaceticacid 1% in Triacetane | | 10.00 |
| | 1,000.00 | 1,000.00 |

The aroma of the flavor substance—basic composition A is influenced in a terpenous, fruit skin peel and herbal-fruitier manner by the addition of thioacidic acid (Column B; 10 parts by weight of a 1% solution in triacetane).

EXAMPLE 4

| Flavor Composition Guava: | A | B |
|---|---|---|
| Maltol | 4.50 | 4.50 |
| beta-Ionone | 0.20 | 0.20 |
| cis-3-Hexenol | 0.50 | 0.50 |
| Hexenylisovalerate | 1.00 | 1.00 |
| Cinnamylacetate | 2.00 | 2.00 |
| -Undecalactone | 2.00 | 2.00 |
| Lemon | 4.00 | 4.00 |
| Ethylacetate | 6.00 | 6.00 |
| Propyleneglycol | 979.80 | 979.80 |
| Thioacetic acid 1% in Ethanol | | 3.00 |
| | 1,000.00 | 1,000.00 |

The aroma of the basic composition A is rendered more sulfurous, terpene-fruitier by the addition of thioacetic acid (Column B; 3 parts by weight of a 1% solution in ethanol) and gives a more tropical impression.

What is claimed is:

1. A process for modifying a flavoring composition for a consumable material, said process comprising adding to said flavoring composition a flavor modifying amount of a thiocarbonic acid or carbothioic acid of formula (I):

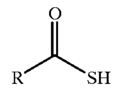

wherein R is methyl, ethyl, propyl, or phenyl.

2. Process as in claim 1, further comprising adding said flavoring composition to a consumable material selected from the group consisting of food and orally administered medicine.

3. Process as in claim 2, wherein the amount of thiocarbonic acid or carbothioic acid of the general formula added to said flavoring composition is less than $10^{-4}$ parts by weight.

4. Process as in claim 3, wherein the amount of thiocarbonic acid or carbothioic acid of the general formula added to said flavoring composition is between $10^{-6}$ and $5\times10^{-4}$.

5. Process as in claim 1, wherein said flavoring composition is a tropical fruit flavoring composition.

6. Process as in claim 5, wherein said flavoring composition is a grapefruit, guava, mango, pineapple or passsion fruit flavoring composition.

7. A process for modifying a fragrance composition for a non-consumable material, said process comprising adding to said fragrance composition a fragrance modifying amount of a thiocarbonic acid or carbothioic acid of formula (I):

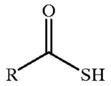

wherein R is methyl, ethyl, propyl, or phenyl.

8. Process as in claim 7, further comprising adding said fragrance composition to a non-consumable material selected from the group consisting of soap and laundry detergent.

9. Process as in claim 7, wherein the amount of thiocarbonic acid or carbothioic acid of the general formula added to said fragrance composition is less than $10^{-4}$ parts by weight.

10. Process as in claim 9, wherein the amount of thiocarbonic acid or carbothioic acid of the general formula added to said fragrance composition is between $10^{-6}$ and $5\times10^{-4}$.

11. Process as in claim 7, wherein said fragrance composition is a tropical fruit fragrance composition.

12. Process as in claim 8, wherein said fragrance composition is a grapefruit, guava, mango, pineapple or passsion fruit fragrance composition.

13. An aroma and/or flavor composition, said composition comprising between $10^{-6}$ and $5\times10^{-4}$ parts by weight of a thiocarbonic acid or carbothioic acid of formula (I):

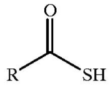

wherein R is methyl, ethyl, propyl, or phenyl.

14. An aroma and/or flavor composition as in claim 13, wherein said aroma and/or flavoring composition is a tropical fruit aroma and/or flavoring composition.

15. An aroma and/or flavor composition as in claim 13, wherein said aroma and/or flavoring composition is a grapefruit, guava, mango, pineapple or passion fruit flavoring composition.

16. A process for modifying the organoleptic properties of a flavoring or fragrance composition, said process comprising adding to said flavoring or fragrance composition a flavor or fragrance modifying amount of a thiocarbonic acid or carbothioic acid of formula (I):

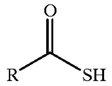

wherein R is methyl, ethyl, propyl, or phenyl.

* * * * *